UNITED STATES PATENT OFFICE.

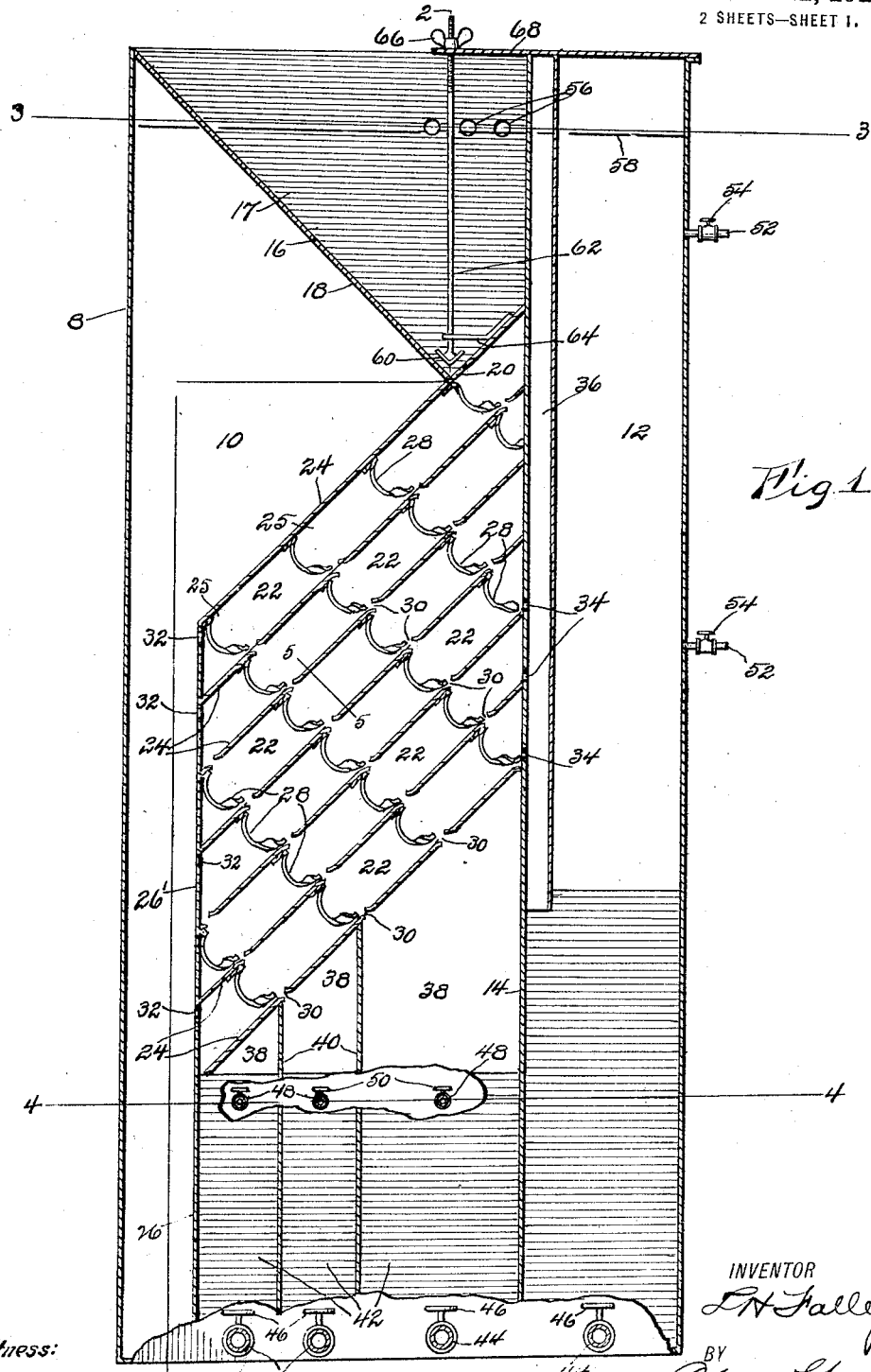

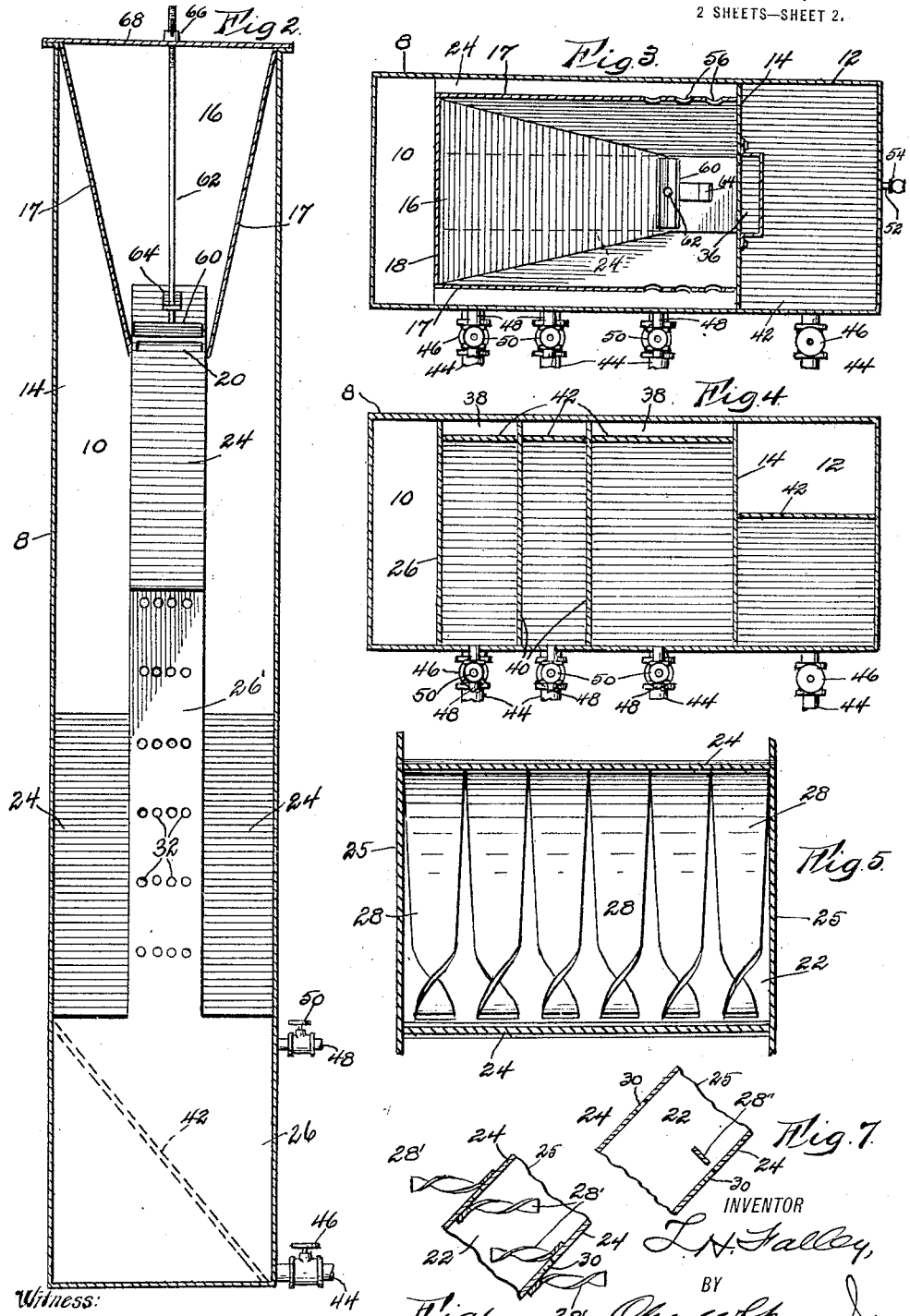

LEWIS H. FALLEY, OF KANSAS CITY, MISSOURI.

SEPARATING AND CLASSIFYING APPARATUS.

1,410,288.  Specification of Letters Patent.  Patented Mar. 21, 1922.

Application filed June 30, 1919. Serial No. 307,632.

*To all whom it may concern:*

Be it known that I, LEWIS H. FALLEY, a citizen of the United States, residing at Kansas City, in the county of Jackson, State of Missouri, have invented certain new and useful Improvements in Separating and Classifying Apparatus, of which the following is a complete specification.

The present invention relates to apparatus for use in the treatment of granular substances or materials, and aims to provide an improved tank structure adapted for the cleaning, separating and classifying of such materials, the invention contemplating the treatment both of materials which are heavier than water, and also, under certain conditions, materials that are lighter than water, for which purpose a suitable fluid medium is employed in carrying out the required cleaning and separating operation.

It is also sought to provide a construction especially adapted for the treatment of ore-carrying materials in such a way as to clean, separate and classify the same in an efficient manner, the operation of the apparatus in this class of work effecting also a dewatering function as well as a cleaning action.

Another purpose of the invention is to provide a construction of increased economy and efficiency, in that a smaller volume of the fluid medium is required for carrying out the cleaning and separating operations, a wider variety of materials may be treated by the improved apparatus, and the number of separations or classifications effected thereby can be readily extended to any desired extent. A further feature of economy sought to be obtained is in compactness of structure, to the end that the amount of space required for its accommodation may be reduced to the minimum.

With these general objects in view, as well as minor objects which will appear in the course of the detailed description, the invention will now be described with reference to the accompanying drawings illustrating one form of construction which I have devised for embodying the proposed improvements, after which the various novel details will be set forth and particularly defined in the appended claims.

In the drawings—

Figure 1 is a central vertical sectional view showing an apparatus constructed in accordance with the present invention;

Figure 2 is a vertical section taken on the line 2—2 of Figure 1;

Figures 3 and 4 are transverse sections taken on the lines 3—3 and 4—4, respectively, of Figure 1;

Figure 5 is an enlarged detail sectional view, taken on the line 5—5 of Figure 1; and Figures 6 and 7 are similar detail views showing modified forms of baffle structures.

Referring to the drawings in detail, the improved construction is illustrated as comprising a tank 8, which is divided into two major compartments 10 and 12 by a vertical transverse partition 14. At the top of the compartment 10 is provided a receiving compartment 16 into which is fed the material to be treated, said compartment being formed by the upper part of the partition 14 in conjunction with two downwardly inclined side partitions 17 and a similarly inclined transverse partition 18. The receiving compartment 16 discharges through an opening 20 into a settling compartment structure which comprises a plurality of shallow compartments 22 formed by a plurality of downwardly inclined partitions 24 arranged in parallel and spaced relation between the partition 14 and the upper narrow portion 26' of a vertical partition 26 in the compartment 10, the sides of said compartments 22 being formed by a pair of spaced side partitions 25 connecting the sides of the partitions 24, the lowermost partition 24 extending entirely from side to side across the compartment 10, as shown in Figure 2.

Each of the compartments 22 is provided with a deflecting or baffle structure for interrupting the passage of the material therethrough and thereby agitating the flow of said material in its course through each compartment. In the construction illustrated in Figures 1 and 5, this baffle structure comprises a series of downwardly tapered baffle elements 28 depending from the partitions 24 forming the upper sides of the several compartments and extending substantially entirely across the compartments transversely. Preferably the lower free end portion of each of said baffle elements 28 is formed with a twisted contour for the purpose of not only baffling the flow of the material but also slightly deflecting the same and imparting a slight twisting movement thereto. The several compartments 22 are also arranged in communicating relation by means of openings 30 in the several partitions 24, preferably located opposite the free end portions of the various baffle elements 28. At their lower ends the compartments 22 are also provided with openings 32 for allowing communication between said compartments and the major compartment 10, said openings 32 being located near the upper walls of said compartments 22, i. e., just beneath the lower ends of the several partitions 22 dividing said compartments, as shown in Figure 1 of the drawings. Outlet openings 34 are also provided in the partition 14 from several of the lower compartments 22 into the compartment 12, these openings being located near the lower walls or bottoms of said compartments, or just above the upper ends of the partitions forming the bottoms of these compartments, as illustrated in connection with the three lower compartments 22 shown in Figure 1. These openings 34 discharge into a conduit 36 arranged vertically in the compartment 12 and extending from its upper end to a level below the lowermost of the openings 34. The outlet openings 30 from the lowermost compartment 22 discharge into separate discharge compartments 38 which are formed by means of vertical partitions 40 arranged in spaced relation between the partitions 14 and 26. Within these compartments 38, as well as in the bottom of the compartment 12, are arranged inclined partitions or false bottoms 42 for deflecting the separated product toward one side of the tank in the direction of a series of discharge pipes 44 fitted with valves 46.

At the same side of the tank 8 as the pipes 44, the tank is also fitted with pipe connections 48 having valves 50 for admitting a supply of suitable fluid, such as water or air, into the discharge compartments 38, said pipes 48 being connected to the tank above the level of the discharge pipes 44. Pipes 52 fitted with valves 54 are also connected at different levels to the upper portion of the tank in communication with the compartment 12, for use in regulating the water level in the tank whenever water is being used as the working medium. Overflow openings 56 are provided in the sides 17 of the receiving compartment 16 in line with the working water level, when such medium is used, said water level being indicated by the broken line 58 in Figure 1.

A valve member 60 is located opposite the opening 20 at the base of the receiving compartment 16, being carried by a rod 62 operating through a guide bracket 64 and provided with a thumb nut 66 at the upper end of said rod and resting on the top 68 of the tank; by means of this construction the passage through the opening 20 may be conveniently regulated.

In the operation of the apparatus, the material to be treated is fed into the upper end of the tank into the receiving compartment 16, from which it is continuously discharged through the opening 20 into the upper separating compartment 22. When liquid, such as water, is used as a working medium, the required volume of this liquid is maintained, by regulation of the valves 50 and 54, at a level with the overflow openings 56, as indicated by the line 58. Thus a constant head is maintained at a level above the separating compartments 22, the liquid flowing in from the pipes 48 to replace any which is discharged in the separating operation; and this arrangement, and the provision of the overflow openings 56, automatically takes care of any variations in the feed water by which the material is carried into the receiving compartment. As the material settles downward in the upper compartment 22, it encounters the baffle members 28 which serve to agitate and break up the flow of the material, particles of which are separated from the stream of the material and carried down through the openings 30 into the next lower compartment 22. As fast as material leaves the compartments 22, some of the liquid from the compartment 10 enters by way of the openings 32, and additional quantities of liquid are constantly being admitted from the discharge compartments 38, to assist in replacing the material which has been discharged, and thus counter currents in the direction of the receiving compartment 16 are established to a certain extent, which counter currents operate in conjunction with the peculiar form of the baffle members to produce combined upward and twisting movements in the stream of the material as it progresses through the compartments. This results in retarding the progress of the lighter particles of the material and in retaining these lighter particles in the vicinity of the upper ends of the compartments 22, while the heavier particles of the material settle gradually toward the lower ends of said compartments. This operation is followed out through the entire series of the compartments 22, which in practice I find desirable to make of a width substantially equal to a third of the width of the tank 8, as is illustrated in Figure 2, thus producing a confined and restricted course for the material during the separating process, the operation of which is rendered more effective by confining the stream of material to these comparatively narrow passages. A further characteristic of the settling operation is that due to the renewal supply of the liquid medium being in communication with the base of the settling compartment structure, which gives rise to a buffer or cushioning action retarding the discharge from the lowermost compartment, thereby increasing the pressure flow through the upper compartments. The lightest of the particles of the material are discharged through the openings 34 into the conduit 36, whence they are conducted to the bottom of the compartment 12 for discharge through the corresponding pipe 44. The heavier particles are separated and discharged in classified (or, in ore treatment, called concentrated) form into the several compartments 38 from which they are drawn off from time to time through the pipes 44.

In Figures 6 and 7 are illustrated modified forms of baffle structures, Figure 6 showing two sets of twisted baffle fingers 28' for each compartment 22, these fingers extending horizontally and in opposite directions at the top and bottom, respectively, of each compartment; while in Figure 7 I show simply a transverse bar 28" adapted to be located at intervals in each compartment 22, these bars being spaced slightly above each of the outlet openings 30.

It is thus apparent that I have provided a practical and efficient form of construction for embodying the proposed improvements. The apparatus is of compact form adapted to require but a small amount of space for its installation, and at the same time is of a character adapted to be modified or extended in an obvious manner to produce any desired number of classifications of the material. Besides the effectiveness of the operation of the apparatus as a separating and classifying device, it provides increased economy as regards the quantity of liquid medium required for its operation, and the dewatering action of the device above referred to is a special feature of advantage where ore is being treated. One of the specific applications for which the apparatus is specially useful is in connection with the washing of finely divided solids, such as chemical precipitates, from liquids, as well as for the washing or separating of dissolved solids or soluble matter in solution from finely divided solids. Again, while the operation of the apparatus has for the most part been described with particular reference to its use in connection with a liquid medium, it is also adapted for use in a similar manner in the cleaning, separation and classification of granular materials which are lighter than water, such as grain, seeds, etc., in which case air may be substituted in place of the liquid medium; in operation with such materials it is only necessary to maintain the intake end of the apparatus reasonably air-tight, as by means of a canvas hood or the like (not shown), in carrying out the operation of the device with this type of working medium.

While I have described and illustrated what I now regard as the preferred form of construction for embodying the invention, I desire to reserve the right to make such formal changes or modifications as may fairly fall within the scope of the appended claims.

Having described the invention, what I claim is:

1. An apparatus of the character described comprising a tank provided with a liquid medium and with a downflow settling compartment arranged in inclined relation therein, and communicating with the medium surrounding said compartment, means for baffling the downflow through said compartment, the upper end of said compartment and the lower side thereof being provided with a series of outlet openings.

2. An apparatus of the character described comprising a plurality of downflow settling compartments arranged in inclined superposed and parallel relation, means for baffling the downward flow through each of said compartments, and means providing communication between adjoining compartments, the lower of said compartments being provided with a plurality of separate outlet openings for the discharge of the material being treated.

3. An apparatus of the character described comprising a plurality of downflow settling compartments arranged in inclined superposed and parallel relation, means for baffling the downward flow through each of said compartments, means providing communication between adjoining compartments, the lower of said compartments being provided with a plurality of separate outlet openings for the discharge of the material being treated, and means for separately collecting the material as discharged from said outlet openings.

4. An apparatus of the character described comprising a plurality of downflow settling compartments arranged in inclined superposed and parallel relation, a plurality of spaced baffle members projecting transversely across each of said compartments, the lower sides of said compartments being provided with outlet openings arranged opposite said baffle members, and providing communication between adjoining compartments, and means for separately collecting the material as discharged from the outlet openings of the lowermost of said compartments.

5. An apparatus of the character described comprising a plurality of downflow settling compartments arranged in inclined superposed and parallel relation, a plurality of spaced baffle members projecting transversely across each of said compartments, the lower sides of said compartments being provided with outlet openings arranged opposite said baffle members and providing communication between adjoining compartments, means for separately collecting the material as discharged from the outlet openings of the lowermost of said compartments, and means providing discharge outlets at the upper ends of the lower of said compartments and for collecting the material as discharged therefrom.

6. An apparatus of the character described comprising a tank provided with a downflow settling compartment arranged in inclined relation therein, means for baffling the downflow through said compartment, the lower side of said compartment being provided with a series of outlet openings, and means for maintaining a supply of liquid medium in said tank at an approximately constant level above said compartment.

7. An apparatus of the character described comprising a tank, a receiving compartment in the upper end of said tank provided with overflow openings intermediate the top and bottom of said compartment, means for maintaining a supply of liquid medium in said tank at an approximately constant level corresponding to the height of said overflow openings, and a downflow settling compartment immersed in said liquid medium in inclined relation below said receiving compartment and in communication with both said receiving compartment and with the liquid medium surrounding said downflow compartment.

8. An apparatus of the character described comprising a plurality of downflow settling compartments arranged in inclined and superposed relation and parallel to each other, means for baffling the downward flow through each of said compartments, means providing communication between adjoining compartments, the lower of said compartments being each provided with an outlet opening at its upper end, a discharge compartment communicating with said outlet openings, and a plurality of discharge compartments associated at different points with the lower side of the lowermost of said settling compartments.

In witness whereof I hereto affix my signature.

LEWIS H. FALLEY.